(12) United States Patent
Allen

(10) Patent No.: US 8,744,961 B2
(45) Date of Patent: Jun. 3, 2014

(54) METHOD OF PROVIDING SECURE PAYMENT AND TRANSACTION RECONCILIATION

(75) Inventor: Robert M. Allen, Richardson, TX (US)

(73) Assignee: StoneEagle Services, Inc., Richardson, TX (US)

(*) Notice: Subject to any disclaimer, the term of this patent is extended or adjusted under 35 U.S.C. 154(b) by 711 days.

(21) Appl. No.: 12/622,976

(22) Filed: Nov. 20, 2009

(65) Prior Publication Data

US 2010/0138324 A1    Jun. 3, 2010

Related U.S. Application Data

(63) Continuation-in-part of application No. 10/708,247, filed on Feb. 19, 2004, now abandoned.

(60) Provisional application No. 60/481,140, filed on Jul. 25, 2003.

(51) Int. Cl.
*G06Q 40/00*    (2012.01)

(52) U.S. Cl.
USPC .................. 705/40; 705/38; 705/39

(58) Field of Classification Search
USPC ............... 705/35, 38, 30, 44, 64, 40
See application file for complete search history.

(56) References Cited

U.S. PATENT DOCUMENTS

| | | | |
|---|---|---|---|
| 6,901,387 B2* | 5/2005 | Wells et al. .................. | 705/64 |
| 2002/0077837 A1* | 6/2002 | Krueger et al. .............. | 705/1 |
| 2004/0133488 A1* | 7/2004 | Daidone et al. ............. | 705/34 |

* cited by examiner

*Primary Examiner* — Ojo Oyebisi
(74) *Attorney, Agent, or Firm* — Anton J. Hopen; Andriy Lytvyn; Smith & Hopen, P.A.

(57) ABSTRACT

A method of paying a merchant for a transaction associated with a program. The method including the steps of receiving a request from a merchant for a payment associated with a purchase, generating a payment identifier, generating a payment number having a predetermined limit amount and a predetermined expiration date, associating the payment identifier with the payment number and transmitting the payment number to the merchant for payment of the request.

6 Claims, 7 Drawing Sheets

METHOD OF PROVIDING SECURE PAYMENT AND TRANSACTION RECONCILIATION

CROSS REFERENCE TO RELATED APPLICATIONS

This application is a continuation-in-part of U.S. patent application Ser. No. 10/708,247, entitled, "Method of Providing Secure Payment and Transaction Reconciliation", filed Feb. 19, 2004, which claims the benefit of priority to U.S. Provisional Patent Application 60/481,140, entitled, "Stored Value Card Reconciliation Method", filed Jul. 25, 2003, the contents of which applications are herein incorporated by reference.

FIELD OF INVENTION

This invention relates to data processing for financials. More specifically, this invention relates to a method of providing fraud protection and reconciliation for credit card transactions.

BACKGROUND OF THE INVENTION

Fraudulent charges on credit cards and overcharges are commonly experienced in the traditional credit card processing industry. It is not uncommon for a merchant to either unintentionally, or intentionally, over-charge a customer's credit card or present an unauthorized charge to the card. The fraudulent charge can be addressed with the credit card company issuing the card. However, the process is time consuming and does not provide a guarantee of reimbursement to the customer. Additionally, often times with a fraudulent dispute, the customer does not become aware of the fraudulent charge until reconciliation at the end of the statement period, resulting in an additional delay in reimbursement resolution. Overcharges present a different problem. Most companies have a high-end limit for overcharges. When charges are over the limit, the merchant is contacted and a reversal or adjustment is requested. This also happens at the end of the statement period, resulting in additional research into the charges due to the lapse of time.

In a typical overcharge scenario, a merchant neglects to charge a credit card administrator for a portion of a transaction, such as for towing a vehicle to a repair facility as part of a repair. To correct the oversight the credit card is run a second time for a sixty-five dollar towing fee. The second charge results in an overcharge condition that is not evident until the two individual charges are reconciled at the end of the statement period. In another scenario, an additional ten dollars is initially charged to the credit card because the merchant knows the ten dollars is not enough to elicit a dispute, resulting in a fraudulent overcharge to the credit card.

The largest expense that is incurred when using a credit card to settle payments, is the time consuming process of reconciling the credit card statement to the payments that were processed in this manner. In many large credit card administration organizations, there is an entire staff of individuals devoted to this task. Research indicates that it takes at least one person, one week a month to reconcile a statement with as few as three hundred charges. When a charge cannot be reconciled, additional personnel become involved, at an additional expense, to determine how to write off the net adjustments.

Purchasing cards are known in the art as a means of streamlining the traditional purchase order and payment processes for low value transactions. Users, typically corporations and government agencies, find a disproportionate number of small dollar payments, those less than $1,000, make up the majority of payments while representing a small percentage of the dollars spent. The transactional cost of making these payments using the traditional process is the same regardless of the dollar amount of the payment. Often the cost of making a payment exceeds the value of the item being acquired. A purchasing card simplifies the process and reduces the transactional cost.

A purchasing card can be used to track charges that have been executed by buying agents and are most widely used in large corporations to track buyer activity. The merchant card device recognizes that the card being processed is a purchasing card and requires a code to be entered after the card is run. This code can be provided on the billing statement to aide in reconciliation. However, purchasing cards are only effective for providing reconciliation enhancements when used at a merchant whose point of sale card system requests the purchasing code. Most point of sale card readers are not programmed for this functionality. Additionally, a purchasing card does not provide fraud or overcharge protection.

It is also known in the art to add an authorization code field to the claim record on the administrator's database. In this scenario, those individuals responsible for payment to the merchant or claims examiners supply the card number and authorized amount to the merchant and then wait for the merchant to run the card. When the purchase is completed and the authorization prints, the merchant reads the authorization code to the examiner and the examiner types the code into a data field associated with the payment. Reconciliation can be accomplished by matching the authorization codes from the credit card statement to the authorization codes on the payment file.

Although the incorporation of authorization codes has proven to be the most effective method of enhancing reconciliation to date, it is extremely time consuming. The credit card administrator spends three to five additional minutes per payment on the phone in this process result in increased labor and capital expenses. The incorporation of authorization codes does not provide guaranteed reconciliation. Even by incorporating this time consuming method into the credit card process, it is shown that at best 85% of the payments can be reconciled. Additionally, the incorporation of authorization codes does not provide fraud or overcharge protection.

In a specific example regarding an insurance claim, when an insured customer needs a repair or replacement product, many service institutions require the insurance company to provide a credit card so that immediate payment is made. While the insurance company might prefer to send a check, the delay in printing, delivering, depositing and clearing such funds are not attractive to the service provider. The benefit of receiving credit card information is the speed in which funds and payment can be guaranteed.

The insurance company might take several approaches when providing credit card information. The insurance company may fax the service institution the credit card number with the authorized amount or call the service institution and read the number over the telephone. Frequently, the service institution and insurance company may disagree on what each considers appropriate charges. For example, in the case of a vehicle breakdown, the insurance company may agree to pay for a new water pump for the car but not for the charge to tow the car to the service bay. Often, the service institution, once in possession of the credit card information, will charge for work not authorized by the insurance company. Alternatively, the service institution may undercharge the credit card in view of the amount authorized. The inconsistency and fraud perpetrated on the insurance company and the credit card institution that issued the card results in substantial losses, particularly in view of the substantial amounts involved in warranty claims.

When the insurance company receives the credit card bill, the information contained in the statement is severely limited for reconciliation purposes. A single insurance company credit card statement may have thousands of different claim charges. Matching each charge by service institution and amount is often cumbersome if not impossible. As noted above, service institutions may overcharge or undercharge the authorized amount. Thus, there are no matching transactions to reconcile. Furthermore, if the service institution is a franchise multiple claims may be charged under the same franchise name, making reconciliation even more difficult.

What is needed in the industry is an improved means through which customers can provide payments to a merchant that provides additional fraud and overcharge protection while eliminating the need for tracking authorization codes and purchasing codes. A method of payment is needed that provides swift payment to the merchant while still allowing the payment service administrator to reconcile the merchant payments to the merchants and to the corresponding transactions.

SUMMARY OF INVENTION

The long-standing but heretofore unfulfilled need for a method of providing payments to merchants that reduces fraud and provides reconciliation benefits is now fulfilled by a new, useful, and nonobvious invention.

The present invention is a method of providing a distinct payment number for the purpose of replacing the current process for merchant payments via credit card. The payment number has an associated fixed limit amount. The payment number also includes the ability to specify variable expiration options, the ability to track directly to the transaction, and the ability to upload into existing payment administration systems. It is within the scope of the present invention to provide both a payment number in physical form, as commonly associated with a credit card or gift card, or a virtual payment number that does not exist in physical form, as commonly used in online transactions.

In accordance with the present invention, a method of paying a merchant is provided. The method includes, purchasing a product or service from a merchant by a member of a program, receiving a request from a merchant for a payment associated with the purchase, generating a payment identifier, generating a payment number having a predetermined limit amount and a predetermined expiration date, associating the payment identifier with the payment number, and transmitting the payment number to the merchant for payment.

The payment identifier of the present invention may include the payment number, a contract number associated with the program, an identifier for the member of the program, a load confirmation of the predetermined limit amount, the associated limit amount, and the expiration date of the payment number. It is within the scope of the present invention to store additional data with the payment identifier to include the merchant number, purchase order number, or any other features useful in identifying the transaction.

After the payment identifier has been established and associated with the payment number, the payment number is provided to the merchant for payment of the purchase. The merchant then utilizes the payment number to submit a transaction amount associated with the service provided. The merchant receives the payment and the merchant payment is tracked and due to the association provided by the payment identifier the transaction is automatically reconciled with the payment number and the payment identifier.

In an additional embodiment of the present invention, a payment number may be used for only one transaction. After the payment number is submitted by the merchant for payment of a transaction, the predetermined limit amount is made zero and the card is expired. Any funds associated with the payment number that remain are then unloaded and disassociated from the payment number on a schedule determined by the program administrator.

Additionally, the merchant payment request may also be assigned an acceptance code. The acceptance code is used to provide either approval or denial of the limit amount associated with the payment number transmitted. The approval or denial is based upon the availability of funds for payment. The method of the present invention also includes verification of a valid date based on the expiration date associated with the payment number. The acceptance code is associated with the payment identifier thereby eliminating the need for reconciliation of the transaction statement.

According to one embodiment of the present invention, the method further includes requesting a load of funds equal to the predetermined limit amount, executing the load of funds, generating a confirmation of the load of funds execution, and reconciling the payment number and the payment identifier with the confirmation of the load of funds execution.

In accordance with an additional embodiment of the present invention, a payment number having a predetermined limit amount and a predetermined expiration date is selected from a predetermined group of payment numbers. Accordingly, the payment number can be reused after a time sufficient to guarantee that all transactions have been reconciled that are associated with a particular payment number. Additionally, a group of payment numbers may be assigned to a specific program administrator.

The method of the present invention may be utilized to provide payment to a merchant relating to a plurality of program purchases, including an insurance claim or a warranty claim.

The payment number in accordance with the present invention may be a credit card number, a pre-paid card number, a debit card number, a check card number or a gift card number.

In another embodiment of the present invention, a method of paying a merchant for a claim service provided to a claimant is provided, wherein the method includes, receiving a request from a merchant for a payment associated with a claim, the request further comprising an estimate for repair, verifying that the request received from the merchant is covered under a contract associated with the claimant, establishing a predetermined limit amount for the repair, generating a claim identifier, selecting a payment number, the selected payment number having the predetermined limit amount and a predetermined expiration date, associating the claim identifier with the selected payment number, transmitting the payment number to the merchant for payment of the claim, providing funding for the predetermined limit amount associated with the selected payment number, tracking a transaction amount associated with the selected payment number, and associating the payment number and the claim identifier with the transaction amount, thereby eliminating the need for subsequent reconciliation. Accordingly, the method further includes tracking a plurality of transaction amounts and association of the payment number and the claim identifier with the plurality of transaction amounts.

In one embodiment of the invention, the merchant provides an estimated cost of the repair. The estimated cost of repair can then be used to determine the limit amount associated with the payment number. The limit may be equal to the estimate provided by the merchant, or the limit amount may also be based upon limit amounts associated with similar types of repairs in the industry.

When a request is received from a merchant, verification of coverage may be provided. The coverage verification provides the merchant with a guarantee that the services provided to the claimant are covered under a valid contract with a program administrator. The claimant contract number can then be associated with the claim number to be included in the claim identifier.

An advantage of the present invention is the elimination of over-charges due to fraud or oversight. The present invention establishes a predetermined limit amount and an expiration date associated with a payment number. Providing this payment number to the merchant eliminates the possibility of overcharging for the service provided because the authorized charge amount is bounded by the predetermined limit amount.

Another advantage of the present invention is the elimination of the costs associated with the reconciliation processes. According to the present invention, a payment identifier is associated with each payment number. By associating the payment identifier with the payment number, the program administrator can easily reconcile the transactions to the appropriate transactions thereby greatly reducing the time required for reconciliation by prior art methods.

The method in accordance with the present invention eliminates the entire reconciliation process by associating the request for load of funds, confirmation of the load, any decline of the card and the purchase transaction with the actual claim or transaction details for electronic and immediate payment reconciliation.

The method in accordance with the present invention eliminates the entire check-processing scenario commonly associated with payment of warranty and insurance claims. When a load of funds is requested, the card number, card expiration date and confirmation that the funds where loaded properly are returned to the administrator within seconds.

In further aspects the present invention provides a system for payment variance notification on program contracts. The payment variance notification system communicates with program administrators and financial institutions via a network. The system includes a memory storing an instruction set and data related to a plurality of authorized program payments and a processor for running the instruction set. The processor is in communication with the memory and the network. The processor is operative to facilitate reconciliation and payment deviation notifications to program administrators. The processor performs this function by the operations of (1) receiving data for the payment authorization from the program administrator computer, the data including one or more payment identification elements and a load amount, wherein the combination of payment identification elements uniquely identifies a transaction and forms a first transaction identifier, (2) receiving data for the payment transaction from the financial institution computer, the data including a second transaction identifier and a payment transaction amount, wherein the second transaction identifier can be either the of the first transaction identifier or a payment identification number, (3) comparing data for the load amount from the program administrator computer and the payment transaction amount from the financial institution computer to check for deviations, (4) transmitting notification to the program administrator of deviations between the payment transaction amount and the load amount substantially contemporaneously to the detection of said deviations in the comparing step, the notification comprising the first transaction identifier and the payment transaction amount, and (5) storing the received data from the bank computer for later dissemination to the program administrator.

In an advantageous embodiment of the payment variance notification system, the processor is operative to transmit payment authorizations to one or more merchants. The payment authorizations can include the second transaction identifier and a load amount.

In further embodiments of the payment variance notification system, the processor is operative to transmit payment by fax to one or more merchants. The payment by fax can include a transaction identifier and a load amount. Advantageously, the processor is operative to transmit notification to the program administrator of a failed payment by fax transmission, the notification comprising the first transaction identifier. The notification can further include the time and description of the failed transmission. The notification can also include a fax number associated with the failed transmission.

In additional embodiments of the payment variance notification system, the processor is operative to transmit an authorization to a merchant. The authorization can include a payment card number and an authorization amount. The payment card number is operable in a card processor system and the authorization amount corresponds to the load amount. In an advantageous embodiment the authorization can include the second transaction identifier.

In still further embodiments of the payment variance notification system, the processor is operative to detect declined transactions against a payment card number. The detection of the declined transaction triggers a transmission of notification to a program administrator. The notification can include a transaction identifier and the payment card number associated with the declined transaction. The notification can also include the amount of the declined transaction.

In further embodiments of the payment variance notification system, the processor is operative to detect multiple payment transactions against a load amount. The detection of a second or subsequent payment transaction triggers a transmission of notification to a program administrator, the notification comprising the first transaction identifier and the payment transaction amount. The notification can include the payment transaction amounts of prior payment transactions against the authorized load amount.

In additional embodiments of the payment variance notification system, the processor is operative to detect refunds against settled payment transactions corresponding to a load amount. The detection of the refund triggers the transmission of a notification to a program administrator. The notification includes the first transaction identifier and the refund amount. The notification can also include the amount of the settled payment transaction.

In an additional aspect the present invention provides a system for exception handling of failed payment-by-fax transmissions. The system includes a first computer associated with a repository defining a repository computer. The repository computer is associated with an electronic communications network, and is positioned to receive payment authorizations from a second computer associated with a program administrator and further positioned to provide payment by fax to a plurality of third computers associated with merchant accounts. The payment authorizations are made responsive to payment requests by a merchant. The first computer includes a memory storing an instruction set and data related to a plurality of authorized program payments and a processor for running the instruction set. The processor is in communication with the memory and the network. The processor is operative to receive payment authorizations from a program administrator and to transmit payment by fax to a plurality of merchants. Moreover, the first computer is operative to perform exception handling of failed payment-by-fax transmissions. Exception handling is performed by the operations of (1) receiving data indicative of a failed payment by fax transmission, the received data including a fax number and a transaction identifier, (2) transmitting notification of the failed payment by fax transmission to the program administrator, where the notification includes the transaction identifier, (3) receiving data from the program administrator, the received data including a revised fax number and the transaction identifier, and (4) retransmitting the payment by fax using the revised fax number. In an advantageous embodiment the notification includes the time and description of the failure.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
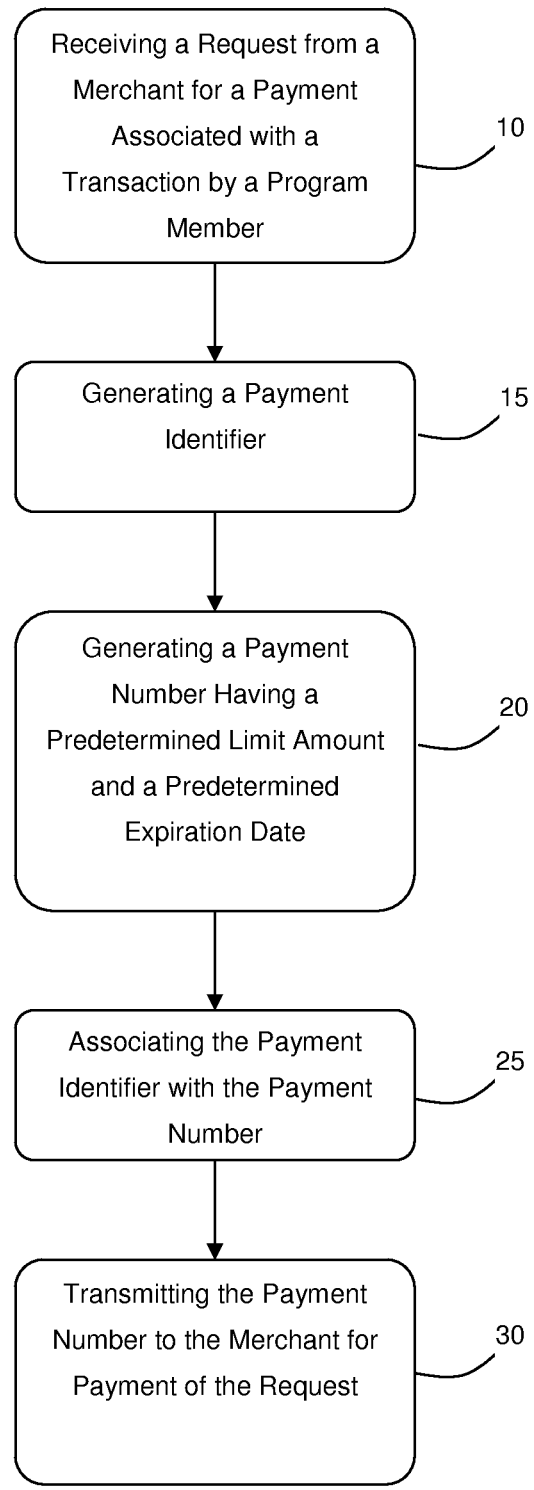
FIG. 1 is a flow diagram of the payment method in accordance with the present invention.

Referring to FIG. 1, the method in accordance with the present invention includes receiving a request from a merchant for a payment associated with a purchase by a member of a program 10. The purchase may be a service or a product provided by the merchant. A payment identifier is generated 15. The payment identifier may consist of a plurality of elements (i.e. payment identification elements) including the payment number, contract number, merchant information, adjustor number or any additional information that would be effective in identifying the transaction. A payment number, or payment identification number ("PID"), is generated having a predetermined limit amount and a predetermined expiration date 20. The payment identifier is then associated with the payment number 25. The association may be established through a database structure as is commonly known in the art. Thus, the payment identifier and the payment number uniquely identify the transaction and these two terms can collectively be referred to as a "transaction identifier." Note moreover that the payment identifier and the payment number need not be the same, though they both uniquely identify the transaction. The payment number is then transmitted to the merchant to satisfy payment of the purchase 30. With this method, the program administrator responsible for payment of the request is provided with assurance that the requested amount will not exceed the predetermined limit amount. Additionally, the program administrator is provided with transaction information associated with a specific payment number to facilitate reconciliation of the payments to the appropriate transactions.

It is within the scope of the present invention to use the method with a variety of programs, including insurance policies, warranty policies, purchasing card groups, and various other programs involving merchant transaction limits.

Figure 2:
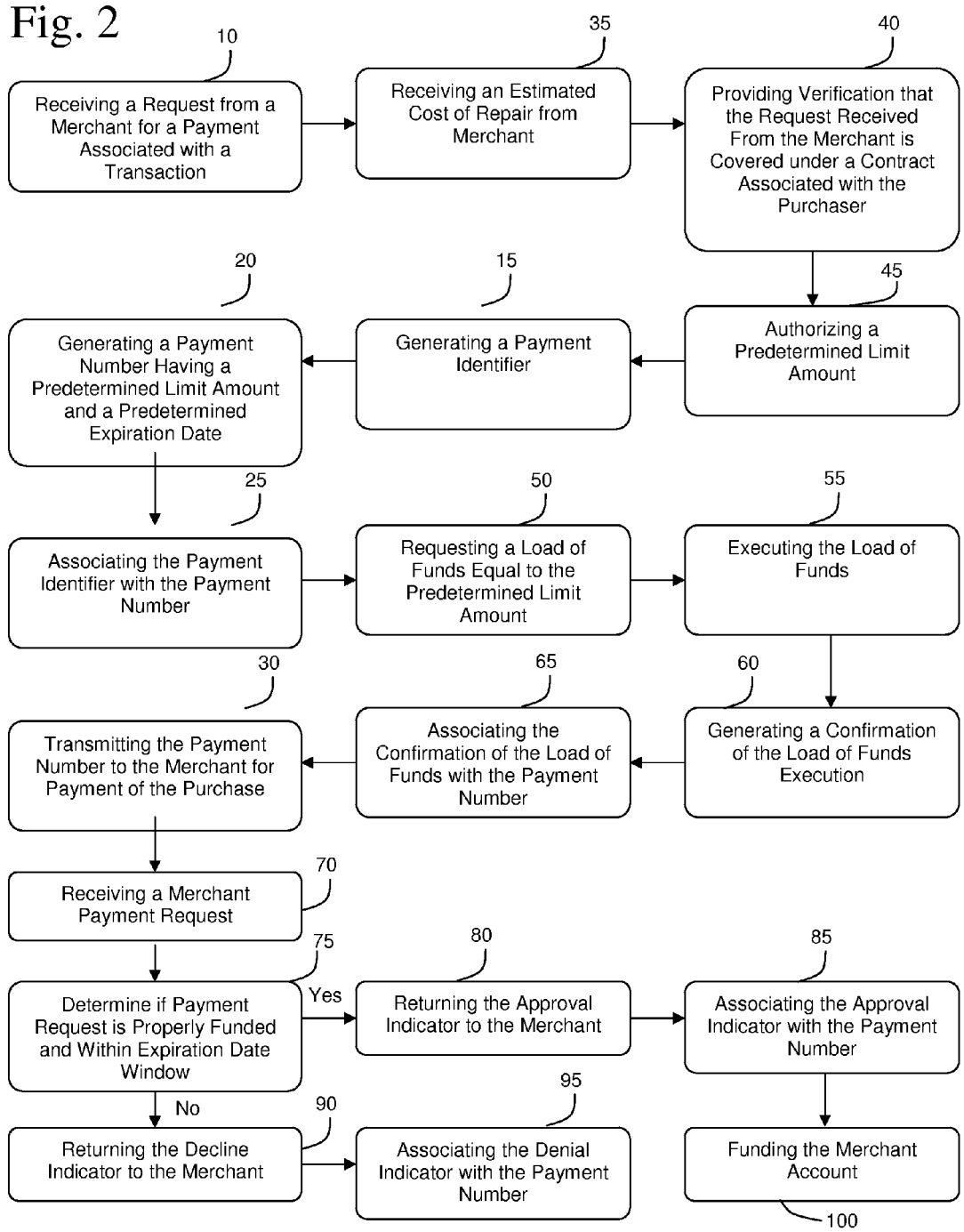
FIG. 2 is a detailed flow diagram of the payment method in accordance with the present invention.

Funding confirmation and transaction event tracking may also be provided in accordance with the present invention. Referring to FIG. 2, the method in accordance with the present invention includes receiving a request from a merchant for a payment associated with a transaction 10. In addition to the request for payment, an estimated cost of the transaction is received from the merchant 35. Verification is provided that the request received from the merchant is covered under an effective contract associated with the purchaser 40. The service provider can provide this verification. A predetermined limit amount is then authorized based on the estimate provided and possibly additional historical data regarding the request 45. A payment identifier is generated 15. A payment number is then generated having the predetermined limit amount and a predetermined expiration date 20. The payment number is then associated with the payment identifier 25. A request is then sent to load funds equal to the predetermined limit amount 50. The load of funds may be requested by the service contract administrator to the payment number processor. The payment number processor may then request the load of funds from the bank responsible for funding the payment number as is typical with a credit card transaction process. The load of funds is then executed 55 as requested and a confirmation of the load of funds in generated 60. The confirmation of the load of funds is then associated with the payment number 65 through the payment identifier thereby providing additional reconciliation information. The payment number is then transmitted to the merchant to satisfy payment of the request 30. Additionally, upon receipt of a merchant request for payment, a determination is made as to whether or not the payment request is properly funded and that the request is within the expiration date window for the payment number 75. If the payment request is properly funded and within the expiration date, an approval indicator is returned to the merchant 80, the approval indicator is associated with the payment number for reconciliation purposes 85 and the merchant account is funded 100. If the payment request is not properly funded or the expiration date has passed, a denial indicator is returned to the merchant 90 and a denial indicator is associated with the payment number for reconciliation 95. This process would be followed for each load request and each merchant payment request, thereby establishing a reconciliation transaction repository including the payment identifier, the payment number and the plurality of transactions.

Figure 3:
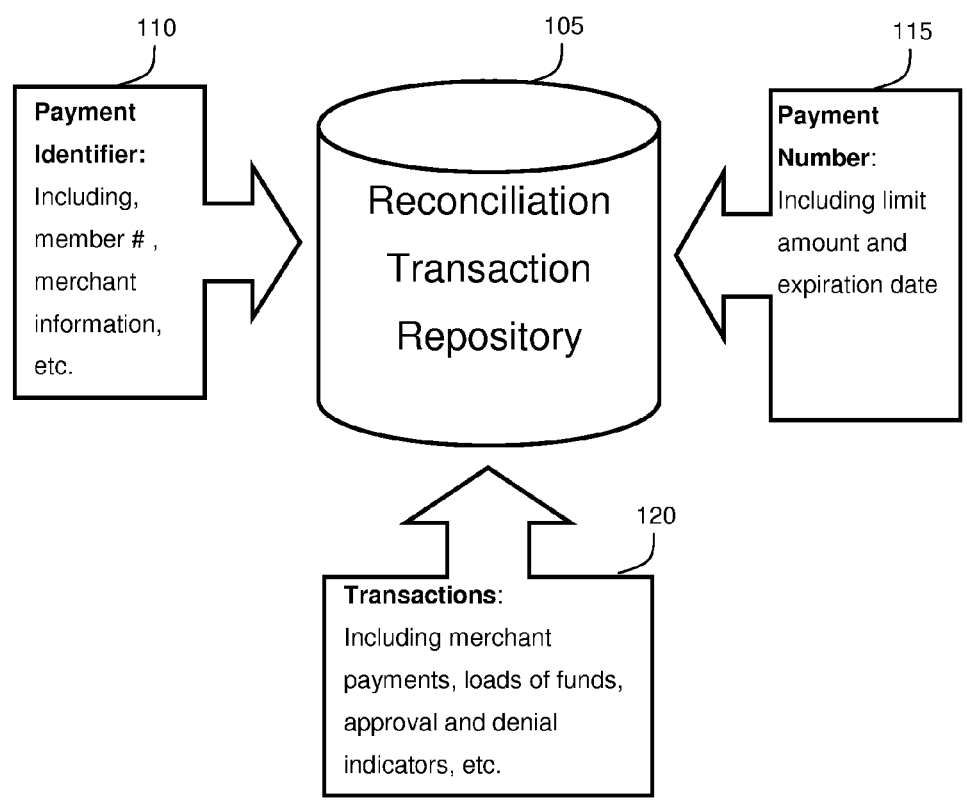
FIG. 3 is a diagram illustrating the reconciliation features in accordance with the present invention.

Detail of such a reconciliation transaction repository is as shown in FIG. 3, in which the components of the payment identifier, including the payment number, contract number, and merchant information 110 are stored in a reconciliation transaction repository 105. The payment number 115 including the limit amount and the expiration date is then associated with the payment number in the reconciliation transaction repository 105. The transactions associated with the payment number 120, including merchant payments, loads of funds, and approval and denial indicators are then associated and stored with the claim number and the payment number in the reconciliation transaction repository 105. The associations established by the reconciliation transaction repository eliminate the need for subsequent reconciliation of the transaction statement by the program administrator.

Figure 4:
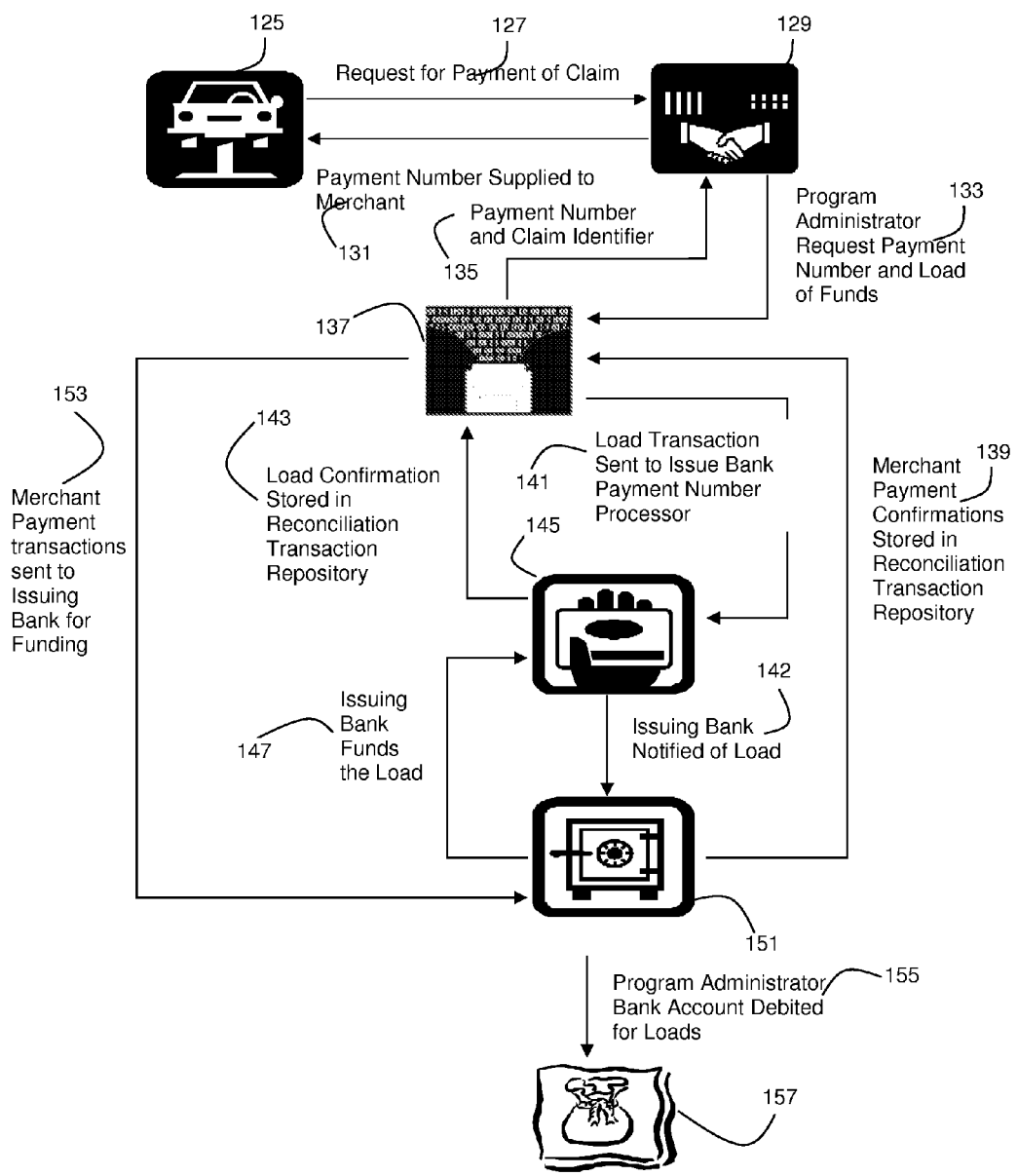
FIG. 4 is an exemplary illustration of a payment method in accordance with the present invention.

In an exemplary embodiment illustrated in FIG. 4, a service provider 125 submits a request for payment on a claim 127 to a program contract administrator 129. The program administrator requests a payment number and load of funds 133. The payment number and the claim identifier are stored in the reconciliation transaction repository 137. The payment and confirmation number are returned 135 to the program administrator 129. The payment number is then supplied to the merchant 131. A load transaction request 141 is sent to the payment number processor 142 associated with the bank responsible for issuing the payment number 151. A confirmation of the load is returned 143 and stored in the reconciliation transaction repository 137. The issuing bank 151 is notified of the load 149 and funds the load 147. Merchant payment transactions are sent to the issuing bank for funding 153. Confirmations of the merchant payments are then transmitted 139 and stored in the reconciliation transaction repository 137. The program administrator bank account 157 is debited for the processed loads 155.

As is common is financial transaction processing, a daily sweep of the bank accounts can be taken and the appropriate transactions recorded and transmitted at that time.

Figure 5:
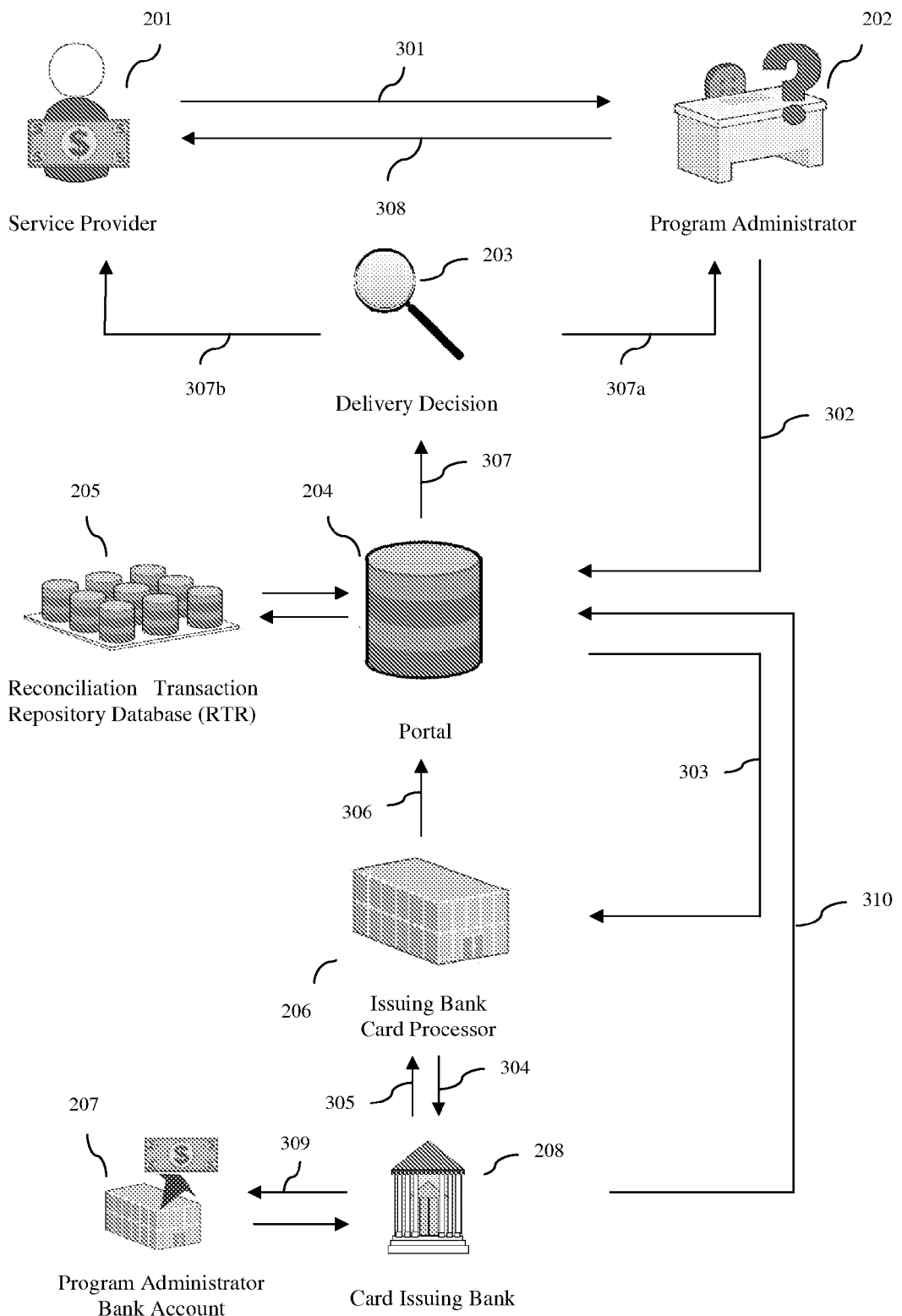
FIG. 5 is a flow diagram of the load card and client account transaction in accordance with the present invention.

Turning now to FIG. 5, the method in accordance with the present invention includes load card and debit client account transactions. The process begins with a service provider 201 requesting payment 301 from a program administrator 202. A member of a program purchases products or services from a service provider/merchant 201. A "merchant" as used in the detailed description and associated claims refers to an entity that trades in goods and/or services. Thus, a merchant would include a person that deals in goods of a certain kind and possesses expertise in the area of the goods and the practices of trading in them or who employs others with such expertise. A merchant as used herein would also include a person providing services (i.e. "service provider") of a certain kind and possessing expertise in the area of the service and the practices in the provision of such services or who employs others with such expertise. The program administrator oversees a program for the benefit of a member of that program, providing payment to the merchant for the delivery of goods or services to the member. Examples of such programs would include warranty coverage on goods or insurance contracts and policies. For example, the warranty could cover brown goods, which are relatively light electronic consumer durables such as TVs, radios, CD and DVD players, and computers, or white goods, which are heavy consumer durables such as air conditioners, refrigerators, stoves, washing machines and dishwashers. Similarly, the warranty contract could cover motor vehicles, such as automobiles, light and heavy duty trucks, boats, motorcycles, ATVs and RVs, providing coverage for mechanical repair collision repair, tire and wheel coverage for damage or defects. In addition, a program could cover medical provider payments for services rendered in a health care setting such as that covered under health insurance plans, HMOs, PPOs and the like. It is further contemplated that other types of insurance policies, such as automobile insurance for repair of collisions or other damage to motor vehicles could be subsumed in such a program.

Thus, there is a "program contract" providing a contractual/binding obligation to provide payment for goods and/or services for the benefit of a covered third party. Additionally, the program contract may arise based coverage under an insurance policy. Accordingly, the service provider/merchant 201 provides the product or service to the member and requests payment. The member presents documentation that provides for payment from the program administrator 202. The service provider/merchant 201 contacts the program administrator 202 for payment 301. The program administrator 202 reviews the charges and a payment is agreed upon.

When a payment amount is agreed upon, the program administrator 202 initiates a request 302 for a payment card number and a load of funds in the amount agreed upon. The request is sent to the portal 204 through a secured web service provided by curator of the reconciliation transaction repository database (RTR) 205. The request 302 includes data that is required and desirable for billing reconciliation once the charge has been made. Examples of the data include the claim number, certificate number, examiner code, dealer code, purchase order, member number, and repair order number.

The RTR 205 retains the reconciliation data for future use and sends 303 the load request to the issue bank card processor 206. This is accomplished through a secure API provided by the issue bank card processor 206. The data sent through the API includes but is not limited to the program administrator 202 load data and the requested load amount. Thus, payment is made by utilizing an association's network. MasterCard is an example of such an association that can be used to facilitate payment to a merchant. Visa, Discover and American Express can serve functions analogous to MasterCard network. To perform the tasks necessary for payment, a primary account number (PAN) is created with a specific bank identification number (BIN) prefix (or issuer identification number (IIN) prefix). Thus the PAN is analogous to a credit card number or debit card number. It allows an electronic transaction to be directed to the proper authorization processor, a function performed by the curator of the RTR database. A unique payment identification number (PID) is associated with every payment request. Thus, the PID can be used to distinguish one payment from another. In contrast the PAN can be used repeatedly in the process. For example, the PAN used by a curator of an RTR can employ a MasterCard BIN. This would allow the transaction to move across the MasterCard association network. Note that while MasterCard is used as an example, it is contemplated that the association could employ other networks designed to facilitate the transfer of money between parties.

The issue bank card processor 206 verifies that the program administrator's account is active and requests 304 the transfer of the load amount from the issue bank 208 to an available credit card number. The issue bank 208 moves 306 the requested load amount to the credit card account at the issue bank card processor 206.

The issue bank card processor 206 then returns 306 the proper load confirmation transaction to the portal 204. The returned data includes the card number, expiration date, transaction I.D. and load amount. From the portal, the returned data is added to the reconciliation transaction repository database (RTR) 205.

Once the data has been returned to the RTR through the portal, an authorization delivery decision 307 is made according to client selection 203. Client controls allow for either the creation and transmission of the payment authorization fax for the client 307b or for a return of the load confirmation with the assigned card number to the program administrator 202 through the same web service mechanism that allows for the load transaction 307a.

If the RTR 205 is not responsible for sending the fax to the service provider 201, the program administrator 202 provides 307b the card number, card expiration date, card security code and card owner name to the service provider 201. The service provider 201 then runs a "card not present" transaction for payment of the service.

Accordingly, the issuing bank 208 debits 309 the program administrators funding account 207 on a negotiated schedule to reimburse the bank for loads. This debit is performed through the Federal Reserve ACH network.

Upon reimbursement 309, the issuing bank 208 transmits 310 all of the detailed transactions that create the summary ACH debit to the portal 204 to be added to the RTR database 205. The RTR data is then used to reconcile the payment transactions generated by the program administrator 202 to the summary debit of the program administrators funding account 207 by the issuing bank 208.

Figure 6:
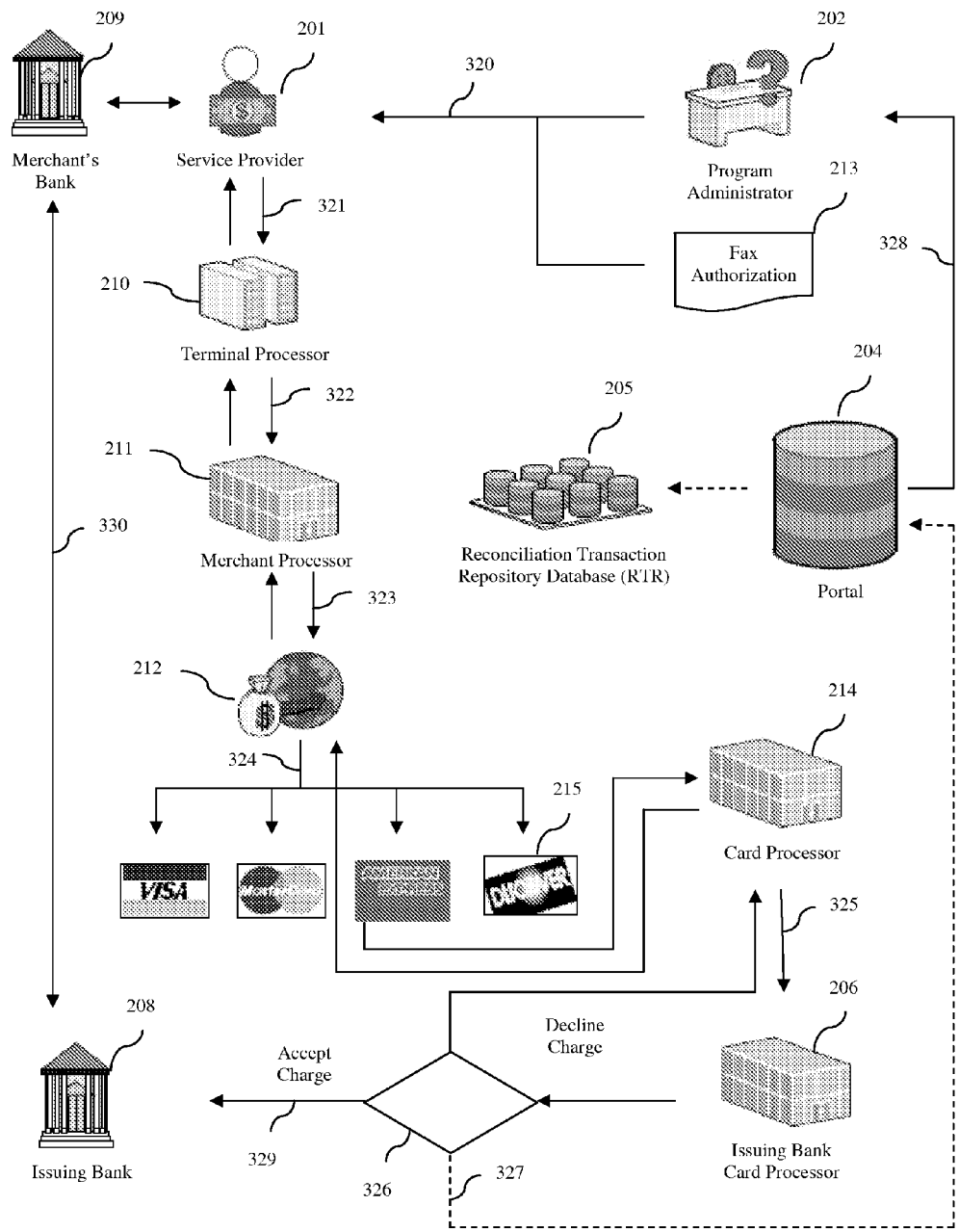
FIG. 6 is a flow diagram of the charge process transaction in accordance with the present invention.

Turning now to FIG. 6, the method in accordance with the present invention includes a charge transaction process. The process begins when a service provider 201 receives 320 a card number and payment authorization from a program administrator 202 or via the portal 204 (See also steps 307a or 307b, respectively of FIG. 5). After receiving 307a the payment card number that was loaded with the exact payment amount from via the portal 204 the program administrator 202 provides 320 the card number to the merchant 201 to be charged. Delivery 320 is handled by either the program administrator 202 or a fax delivery 320 via the portal (See also steps 307a or 307b, respectively of FIG. 5).

The service provider 201 then charges 321 the card number through their existing terminal processor 210. The transaction is routed 322 from the terminal processor 210 to the merchant processor 211. The merchant processor 211 uses the card's BIN number to determine 323 the card network 212 and routes 324 the transaction to the proper card processor 214. The card processor 214 routes 325 the transaction to the issuing bank card processor 206.

The issuing bank card processor 206 makes a decision 326 to accept 329 the charge or decline the charge based on available credit limit and expiration date (assigned by load process). Accepted charges 329 move on and declined charges are returned through the same network.

The issuing bank card processor 206 sends 327 either an accepted or declined transaction via the portal 204 where it is added to the RTR database 205. The RTR database 205, via the portal 204, delivers the transaction information to the program administrator 202 during reconciliation process (see also FIG. 7).

If a decline transaction occurs, the reason for the decline is emailed 328 to the program administrator 202 to allow for a proactive response to the service provider/merchant 201. The email is sent 328 generally to the program administrator's designated payment officer with information describing the cause of the decline. Under charges are also reported to the payment officer by email to facilitate a proactive response.

If the charge is accepted, the issuing bank 208 is notified 329 of the charge. The issuing bank 208 then reserves the funds for the service provider 201 pending settlement.

For the service provider 201 to claim the funds that the issuing bank 208 has reserved on its behalf, the service provider must batch its terminal transactions to the network. The card network will then settle the transactions by facilitating the transfer of funds 330 from the issuing bank 208 to the merchant's bank 209 (i.e. service provider's bank).

Figure 7:
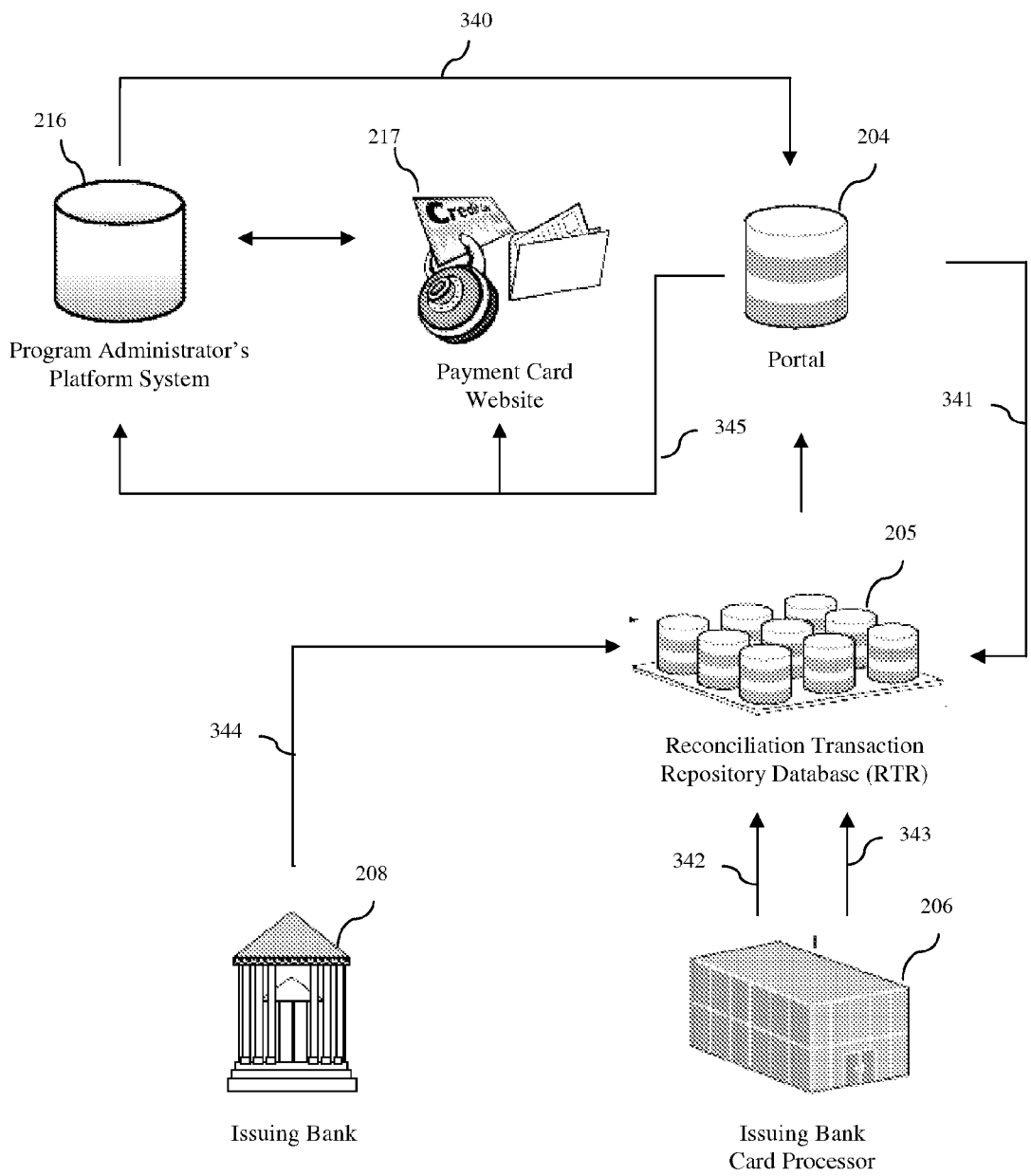
FIG. 7 is a flow diagram of the reconciliation process transaction in accordance with the present invention.

Turning now to FIG. 7, the method in accordance with the present invention includes a reconciliation process. The reconciliation process eliminates the need for a paper statement at the end of every month. All detail payments are summarized and processed as a lump sum ACH reimbursement transaction. This method allows for a single debit to credit reconciliation with all the back-up details if required.

The process begins when a program administrator 202 issues a payment load request to the portal 204 via the program administrator's platform system 216. The web service requires a specific set of data that can be used to tie the load request and any further transaction on the card number to this particular payment.

The load request data is retrieved from the web service where it is delivered 341 to the reconciliation transaction repository (RTR) 205 and maintained with a unique key. This unique key allows all other transactions relating to this card number to be associated with this particular load transaction.

When the load of funds is performed by the issue bank card processor 206, the load confirmation transaction is returned 342 to the portal 204 where it is added to the RTR 205 and matched to the appropriate load transaction.

Charge transactions, of any kind, are transmitted 343 to the portal 204 for addition to the RTR 205 and matched to the appropriate load transaction. Charge transactions can include reserve of funds, decline for insufficient funds, decline for invalid expiration date, accepted charges, under charges, settlements and any other transaction that may occur on the network. This data is retained for statistical and trending reporting purposes.

The ACH transactions that were processed by the issuing bank 208 to bill the appropriate program administrator for the Load Transactions, are transmitted 344 to the portal 204 where they are added to the RTR 205 and matched to the appropriate load transaction.

Reconciliation data is delivered 345 to the program administrator 202 via the program administrator's platform system 216 and payment card web site 217 for seamless, electronic reconciliation. The transactions that are stored in the RTR 205 are made available to the program administrator 202 through the payment card web site 217 and/or delivered to the administrator, via the program administrator's platform system 216, electronically for reconciliation. The load transactions maintain unique data that enables the program administrator to match them to particular payment transactions. The payment transactions are summarized to balance to a set of scheduled ACH transactions. This creates a seamless, electronic reconciliation process that is available to the program administrator on a daily basis. The reconciliation process is further described in the examples below. The examples illustrate the processes of exception handling and payment notification.

EXAMPLES

Exception Handling (EX) and Payment Notification (PN)

A program contract administrator 202 (payor/administrator) requests 302 a payment be made to a merchant/service provider 201 (payee), as discussed above in reference to FIG. 5. The data from the payor's payment request is collected and delivered to the reconciliation transaction repository 205 of the curator of the portal associated with the RTR. The payment may be requested in a number of forms including as a point of sale (POS) credit or debit card transaction, standard check or electronic funds transfer (EFT).

Standard check processing is accomplished by acquiring data from the RTR and constructing an image reflecting all the standards required to process checks. The images are then distributed to a check processing center to be printed and distributed to the merchants. The bank, when processing checks, delivers a cleared check file to the curator for processing into the RTR.

In each case, payment by POS, EFT or check, the payment is received from the payor, distributed to the proper recipient/payee and reconciled without human intervention.

POS transactions are delivered by acquiring data from the RTR and constructing an image with a credit or debit card number incorporated for payment. The POS payment image is then delivered to the payment facsimile platform (PFP) for delivery to the payee (i.e. the merchant/service provider). If for any reason the payment by fax (PBF) fails to deliver, the PFP logs the time, date, reason and description for failure in the RTR. The failure information, when inserted into the RTR database, triggers a notification to the payor by email to a specified distribution list. The notification allows the payor to access the RTR, acquire data from the specific payment and update the fax number for re-submission to the PFP.

Example EX.1

Email Notification for a Failed Facsimile

EFT transactions are delivered by acquiring data from the RTR 137 and constructing a standard National Automated Clearing House Association (NACHA) formatted Automated Clearing House (ACH) file that is delivered to the bank for processing. Each payment record in the ACH file has a reference number that ties this transaction back to the payor's payment request. When the ACH response file is received from the bank, the data is inserted into the RTR and an image with the payment reference number is constructed. The EFT payment image is then delivered to the PFP for delivery to the payee. If for any reason the payment by fax (PBF) fails to deliver, the PFP logs the time, date, reason and description for failure in the RTR. Reasons for failure include an invalid fax number, hang up, detection of human voice, busy signal and no answer. The failure information, when inserted into the RTR database, triggers a notification to payor by email to a specified distribution list. This allows the payor to access the RTR, acquire data from the specific payment and update the fax number for re-submission to the PFP. The EFT image, when received by the payee, serves as an additional method of reconciliation for the payee in identifying EFT deposits to the payee account. An email for a failed fax transmission from support@curator.com, or other email address as associated with the curator of the RTR, can automatically generate an email with the following information:

Outgoing Payment by Fax Failed:

| Client/Payor: | GWG |
|---|---|
| From: | GLOBAL WARRANTY GROUP |
| Payee: | ACME IMPORTS |
| Claim Number: | 343202 |
| Repair Order: | 646315 |
| Contract Number: | IN1S124794 |

Example PN.1

Fraud Attempt and Payment Variance Notification

As POS transactions are received from the association networks (e.g. MasterCard), they are delivered to the reconciliation repository and associated with the original payment request.

The original payment request maintains a specific balance that is credited or debited based on the payee activity. To obtain full reconciliation without human intervention, there can be no deviation from the original payment request amount, stored in the RTR, and the balance that remains after payment has been made. To achieve this level of reconciliation, each transaction from the association network is inserted into the RTR for validation and analysis. By generating notification of each non-reconciling item at the time of variance, as opposed to the end of the period, the variance can be traced and dealt with in a more effective manner, saving time and enhancing the ability to trace the source of the variance.

Example PN.2

Overcharge Attempt Notification

The RTR rules do not allow for overcharges. Therefore it is impossible for a merchant to achieve a pre-authorization for payment that exceeds the RTR's original value for a payment. If a merchant were to attempt to charge an amount that exceeded the RTR's original value, an RTR trigger sends an email, using the curator's client distribution list, to the appropriate parties, including the payee for notification on this action.

An email from support@curator.com can automatically be generated with the following information:

Virtual Card Authorization Variance:

Funds reserve rejected amount $1,077.35 does not match the loaded amount $1,047.35.

| Payor: | GWG |
|---|---|
| Entity: | WHZ11V |
| Payee: | Acme Industries |
| Requester: | Robert Adams |
| Claim: | 382412 |

Example PN.3

Undercharge Notification

If a payee were to under charge the account, the shortfall is reported to the RTR and triggers an email, using the curator's client distribution list, for notification on this action. The difference is accounted for in the RTR and returned to the client via EFT.

An email from support@curator.com can automatically be generated with the following information:

Virtual Card Authorization Variance

Funds Reserved by Merchant amount 262.61 does not match the loaded amount 262.62.

| Payor: | GWG |
|---|---|
| Type: | CLVCP |
| Entity: | IAS001 |
| Payee: | ACME ENTERPRISES |
| Requester: | Robert Richards |
| Claim: | 336255 |

In the above example "Type" would concern the type of payment requested. Given that payments could be requested is various formats, such POS transactions (credit card type), check and electronic funds transfers, a type may be associated with a given payment notification. In the present instance the variance is in a card-type charge.

Example PN.4

Multiple Charge Attempts Notification

If a payee attempts to charge the account more than once, that action is reported to the RTR and triggers an email, using the curator's client distribution list, for notification on this action.

An email from support@curator.com can automatically be generated with the following information:
Virtual Card Multiple Transactions
    Multiple funds reserve rejections found.

| Client: | GWG |
|---|---|
| Type: | CLVCP |
| Entity: | IAS002 |
| Payee: | Allied Acme, Inc. |
| Requester: | Robert Smith |
| Claim: | 336275 |

Example PN.5

Settlement Variance Notification

If a payee posts a transaction (settles) for an amount that varies from the loaded transaction amount, the action is reported to the RTR and triggers an email, using the curator's client distribution list, for notification on this action.

An email from support@curator.com can automatically be generated with the following information:
Virtual Card Settlement Variance
    Settlement amount $1,494.45 does not match the loaded amount $1,500.00.

| Client: | GWG |
|---|---|
| Type: | CLVCP |
| Entity: | IAS003 |
| Payee: | Acme International, Ltd. |
| Requester: | Robert McAllen |
| Claim: | 336755 |

Example PN.6

Force Post of Multiple Transactions Notification

If a merchant force posts or forces a second charge through the network onto the account, that action is reported to the RTR and triggers an email to SE's client distribution list for notification on this action.

An email from support@curator.com can automatically be generated with the following information:
Virtual Card Multiple Transactions
    Multiple Settlements found.

| Client: | GWG |
|---|---|
| Type: | CLVCP |
| Entity: | IAS004 |
| Payee: | Acme Ventures, Inc. |
| Requester: | Robert Alexander |
| Claim: | 346255 |

Example PN.7

Refund Variance Notification

If by chance a merchant should refund funds to the account instead of debit funds from the account, the action is reported to the RTR and triggers an email according to the curator's client distribution list for notification on this action. This allows the client to proactively work with the merchant to reconcile the account without waiting for a billing cycle to complete.

An email from support@curator.com can automatically be generated with the following information:
Virtual Card Refund Variance
    Refunded by Merchant amount $6.29 does not match the loaded amount $75.00.

| Client: | GWG |
|---|---|
| Type: | CLVCP |
| Entity: | IAS005 |
| Payee: | General Acme, Inc. |
| Requester: | Robert Jones |
| Claim: | 336255 |

Example PN.8

Refund Forced Notification

On occasion a merchant will send a refund amount through the network after a successful settlement has been posted. This action is reported to the RTR and triggers an email according to the curator's client distribution list for notification on this action. This allows the client to proactively work with the merchant to reconcile the account without waiting for a billing cycle to complete.

An email from support@curator.com can automatically be generated with the following information:
Virtual Card Refund Forced
    Refunded by Merchant amount 150.00 was forced.

| Payee: | General Industries, Inc. |
|---|---|
| Requester: | Robert Andrews |
| Claim: | 337464 |

Example PN.9

Image Advances

Data is delivered by the program administrator/payor in support of a payment. The received data is inserted into the RTR upon receipt and stored for image creation. When the payment is scheduled, the PFP is triggered to send a payment. The data is acquired from the RTR, moved into image production (could be POS, check or EFT image) and scheduled in the PFP. The scheduling, delivery and/or failure is logged to the RTR for reconciliation. The image is then delivered to the provider by the appropriate route (e.g. facsimile transmission) to effect payment. Accordingly, the image can vary based upon the type of payment being made and the associated industry in which the contract is dedicated.

Example PN.10

Merchant Category Deviation

Merchants are assigned category codes called a Standard Industry Code ("SIC") or Merchant Category Code ("MCC"). Such codes are used by the IRS, processing banks and other institutions as a numeric identifier of the business industry of an entity. A white list of merchant category codes can be maintained and used to check each transaction against. Certain codes are expected to be associated with a particular transaction or transaction type. If the code is not on the accepted white list, a notification is sent to the client/administrator to inform them of the deviation in the SIC/MCC code presenting from the merchant. The email that is constructed contains the information such as in the example below:

Merchant Category Deviation—Not on White List
SIC/MCC Code 5969—Direct Marketing—Not Elsewhere Classified
Client: XTL
Type: CLVCP
Entity: XTLMED
Payee: ADVANTAGE HEALTH PRIM CARE
Requester: XTL3387452
Claim: V0302975

All references cited in the present application are incorporated in their entirety herein by reference to the extent not inconsistent herewith.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A system for a payment variance notification on program contracts, wherein the payment variance notification system communicates with a program administrator and a financial institution computer via a network, and wherein the system comprises a memory storing an instruction set and data related to an authorized program payment having a load amount set by the program administrator and a processor for running the instruction set, the processor being in communication with the memory and the network, wherein the processor is operative to facilitate reconciliation and payment deviation notifications to the program administrator by the operations of:

receiving a first transaction identifier for the authorized program payment;

receiving a second transaction identifier matching the first transaction identifier and a payment transaction amount from the financial institution computer;

comparing the load amount and the payment transaction amount;

transmitting a substantially contemporaneous payment variance notification to the program administrator responsive to detecting multiple payment transactions against the payment limit load amount, wherein the detection of a second or subsequent payment transaction triggers a transmission of a first notification to the program administrator, the first notification comprising the first transaction identifier and the payment transaction amount; and detecting refunds against settled payment transactions corresponding to the load amount, wherein the detection of the refund triggers a transmission of a second notification to the program administrator, the second notification comprising the first transaction identifier and the refund amount.

2. A payment variance notification system as recited in claim 1, wherein the processor is further operative to transmit an authorization to a merchant, the authorization comprising a payment card number and an authorization amount, wherein the payment card number is operable in a card processor system and the authorization amount corresponds to the load amount.

3. A payment variance notification system as recited in claim 1, wherein the notification further comprises the payment transaction amounts of prior payment transactions against the authorized load amount.

4. A payment variance notification system as recited in claim 1, wherein the notification further comprises the amount of the settled payment transaction.

5. A system for a payment variance notification on program contracts, wherein the payment variance notification system communicates with a program administrator and a financial institution via a network, and wherein the system comprises a memory storing an instruction set and data related to an authorized program payment having a first set of transaction parameters set by the program administrator and a processor for running the instruction set, the processor being in communication with the memory and the network, wherein the processor is operative to facilitate reconciliation and payment deviation notifications to the program administrator by the operations of:

receiving a first transaction identifier for the authorized program payment, the first set of transactional parameters of the authorized program payment selected from the group consisting of load amount, merchant category, payment expiration, and single transaction restriction;

receiving a second transaction identifier matching the first transaction identifier and a second set of transactional parameters from the financial institution computer, the second set of transactional parameters selected from the group consisting of load amount, merchant category, payment expiration, and single transaction restriction;

comparing the first transactional parameters with the second transactional parameters;

transmitting a substantially contemporaneous payment variance notification to the program administrator responsive to a deviation between the first transactional parameters and the second transactional parameters;

detecting multiple payment transactions against the load amount, wherein the detection of a second or subsequent payment transaction triggers a transmission of a second notification to the program administrator, the second notification comprising the first transaction identifier and the payment transaction amount; and detecting refunds against settled payment transactions corresponding to the load amount, wherein the detection of the refund triggers a transmission of a third notification to the program administrator, the third notification comprising the first transaction identifier and the refund amount.

6. A system for a payment variance notification on program contracts, wherein the payment variance notification system communicates with a program administrator and a financial institution computer via a network, and wherein the system comprises a memory storing an instruction set and data related to an authorized program payment having a load amount set by the program administrator and a processor for running the instruction set, the processor being in communication with the memory and the network, wherein the processor is operative to facilitate reconciliation and payment deviation notifications to the program administrator by the operations of:

receiving a first transaction identifier for the authorized program payment;

receiving a second transaction identifier matching the first transaction identifier and a payment transaction amount from the financial institution computer;

comparing the load amount and the payment transaction amount;

transmitting a substantially contemporaneous payment variance notification to the program administrator responsive to detecting refunds against settled payment transactions corresponding to the load amount, wherein the detection of the refund triggers a transmission of notification to the program administrator, the notification comprising the first transaction identifier, the refund amount, and the payment transaction amount.

* * * * *